Figure 1:
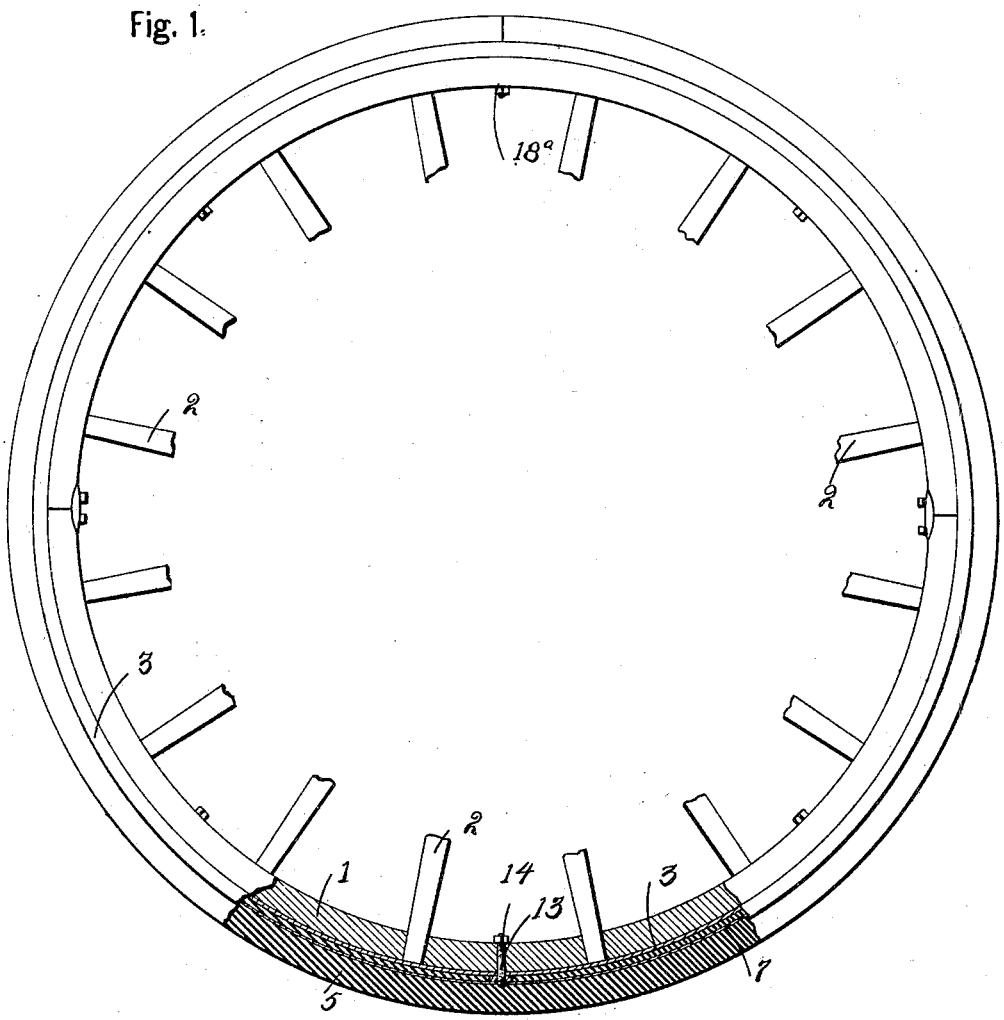

No. 696,688. Patented Apr. 1, 1902.
R. MULHOLLAND.
RUBBER TIRED WHEEL.
(Application filed Aug. 26, 1901.)

(No Model.) 3 Sheets—Sheet 1.

Witnesses. Richard Mulholland Inventor.

By A. J. Sangster

Attorney.

THE NORRIS PETERS CO., PHOTO-LITHO., WASHINGTON, D. C.

No. 696,688. Patented Apr. 1, 1902.
R. MULHOLLAND.
RUBBER TIRED WHEEL.
(Application filed Aug. 26, 1901.)

(No Model.) 3 Sheets—Sheet 2.

Witnesses. Richard Mulholland Inventor.
Chas. Pankow.
Geo. A. Neubauer.
By A. J. Sangster
Attorney.

No. 696,688. Patented Apr. 1, 1902.
R. MULHOLLAND.
RUBBER TIRED WHEEL.
(Application filed Aug. 26, 1901.)
(No Model.) 3 Sheets—Sheet 3.

Witnesses.
Chas. Pankow.
Geo. A. Neubauer.

Richard Mulholland, Inventor.
By C. J. Sangster
Attorney.

UNITED STATES PATENT OFFICE.

RICHARD MULHOLLAND, OF DUNKIRK, NEW YORK.

RUBBER-TIRED WHEEL.

SPECIFICATION forming part of Letters Patent No. 696,688, dated April 1, 1902.

Application filed August 26, 1901. Serial No. 73,272. (No model.)

*To all whom it may concern:*

Be it known that I, RICHARD MULHOLLAND, a citizen of the United States, residing at Dunkirk, in the county of Chautauqua and State of New York, have invented a certain new and useful Improved Rubber-Tired Wheel, of which the following is a specification.

This invention relates to an improved means for securing a tire of rubber or other material to a wheel.

Heretofore different forms of elastic or rubber tires have been provided with wires or bands extending longitudinally through them, and the same have been secured to the wheel or in the metal rim of the wheel by compressing the rubber longitudinally and drawing the wires or bands together under tension and uniting them either by welding, brazing, or lapping at the joint. This method is found to be expensive and requires expert experience to properly weld or braze the bands or wires at the joint. Another defect in the present method is that the lapping or welding of the bands or wires adds to the thickness of the band or wire, and the cavity in the rubber tire being only made sufficiently large to receive the thickness of the band the lap does not permit a free entrance or passage through the rubber. The result is that the retaining bands or wires being rigidly held at one end of the rubber tire where it forms a butt-joint and being comparatively loose at the other end the tire is permitted to slip around through the retaining-band and channel-rim at the side where it is loose and compresses the tire around the side which is tight, which results in an opening or parting of the tire at the joined ends. Still another defect is that the retaining wires or bands cut through or wear enlarged cavities through the tire, permitting the tire to become loose and the wearing out of the tire by creeping or longitudinally sliding in the channel-rim, thus making an imperfect unevenly-arranged tire.
The object of my invention is to obviate these objections and to secure the rubber or other tire to the wheel by simple and easily-assembled means, thereby doing away with the necessity of welding, brazing, or lapping of the joints of the retaining band or wires.

The further object of my invention is to entirely prevent the creeping or longitudinal movement of the tire in the channel-rim and on the retaining-band and to produce an elastic tire which may be readily and quickly applied and attached to a wheel by an ordinary person.

My present invention relates to that class of elastic tire wherein a bolt-head secures the ends of the retaining-band together, as shown in my Patents No. 635,385, October 24, 1899, and No. 646,751, April 3, 1900, as more fully explained hereinafter in detail, and particularly pointed out in the claims, reference being had to the accompanying drawings, in which embodiments of my invention are shown.

Figure 2:
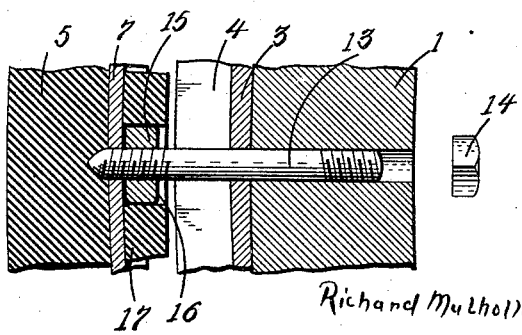
Figure 3:
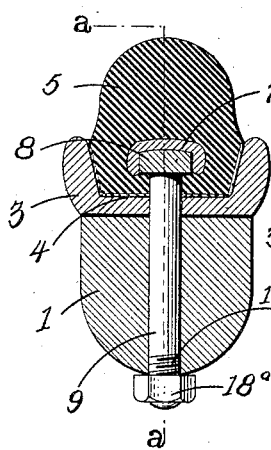
Figure 4:
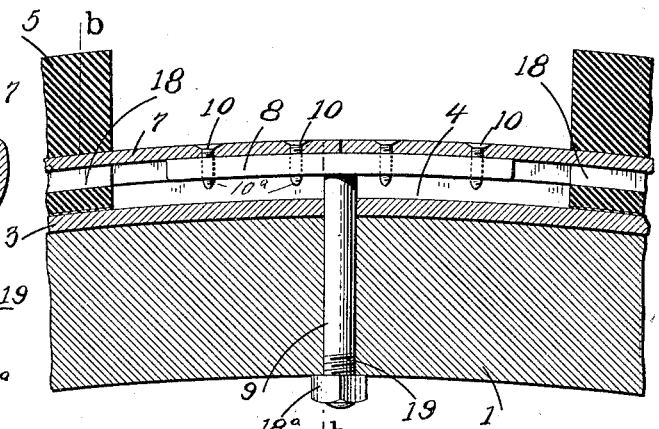
Figure 5:
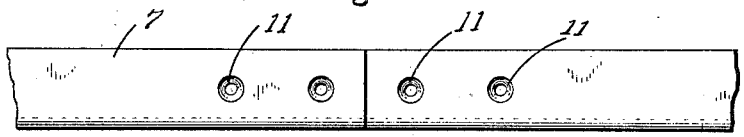
Figure 6:
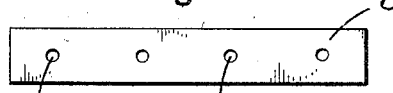
Figure 7:
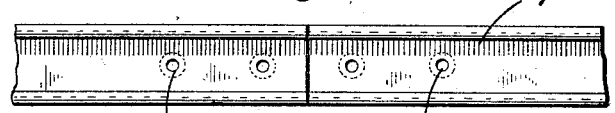
Figure 8:
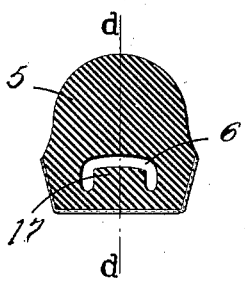
Figure 9:
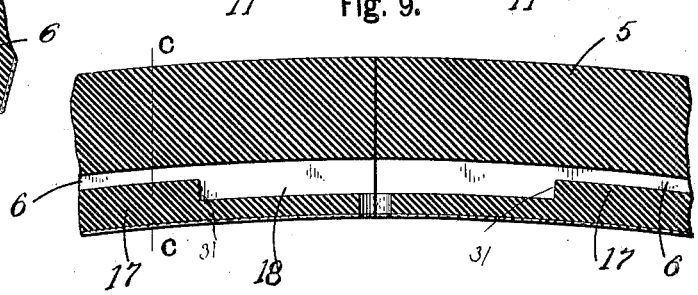
Figure 10:
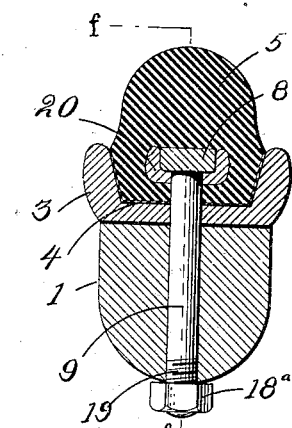
Figure 11:
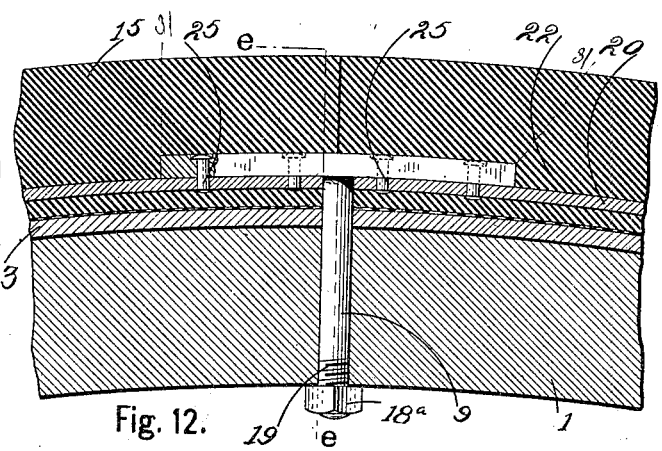
Figure 12:
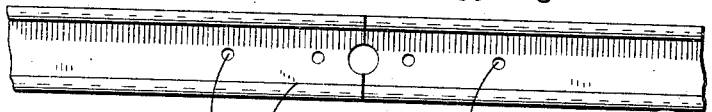
Figure 13:
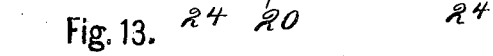
Figure 15:
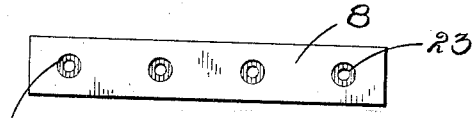
Figure 14:
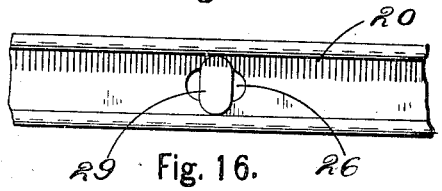
Figure 16:
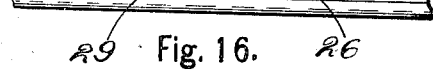
Figure 17:
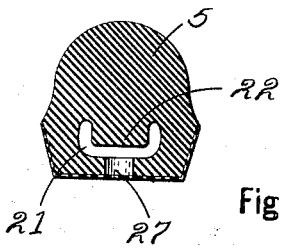
Figure 17:
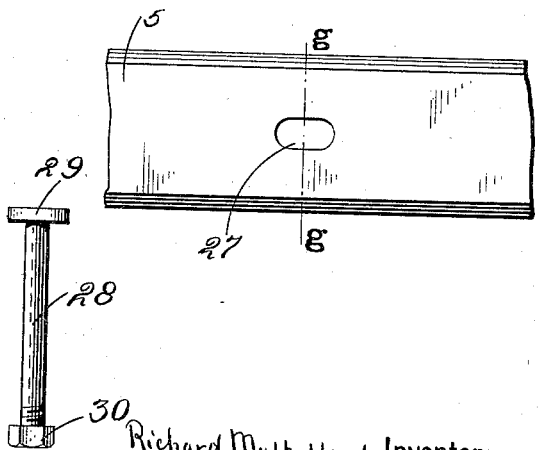

Figure 1 represents a fragmentary view of a wheel, partially in section, having a tire secured thereto by my improved means. Fig. 2 is an enlarged fragmentary section having the fragments of the parts slightly separated to show the manner of introducing and securing locking-bolts in place. Fig. 3 is a transverse section through a felly, rim, tire, and retaining-band constructed in accordance with one form of my invention on line $b$ $b$, Fig. 4, also showing a side view of a locking-bolt with a section through the head of the bolt. Fig. 4 is a fragmentary longitudinal section on line $a$ $a$, Fig. 3, the tire ends being separated from each other to illustrate the manner of longitudinally compressing the tire, also showing one manner of uniting the ends of the retaining-band. Fig. 5 is a detached top plan view of a fragment of one form of the retaining-band. Fig. 6 is a detached top plan view of one form of locking-bolt. Fig. 7 is a detached bottom plan view of a fragment of the retaining-band shown in Fig. 5. Fig. 8 is a detached transverse section through the tire on line $c$ $c$, Fig. 9. Fig. 9 is a fragmentary longitudinal section through the tire on line $d$ $d$, Fig. 8. Fig. 10 is a transverse section through another form of my invention on line $e$ $e$, Fig. 11. Fig. 11 is a fragmentary longitudinal section on line $f f$, Fig. 10. Fig. 12 is a top plan view of a fragment of the retaining-band employed in the form shown in Figs. 10 and 11. Fig. 13 is a top plan view of the locking-bolt used in the form shown in Figs. 10 and 11. Fig. 14 is a top plan view of a fragment of the retaining-band with a supplementary locking-bolt in position. Fig. 15 is a transverse section on line $gg$, Fig. 16. Fig. 16 is a fragmentary bottom view of the tire employed in the form shown in Figs. 10 and 11. Fig. 17 is a detached side view of one form of locking-bolt having an oblong head.

In referring to the drawings for the details of construction like numerals designate like parts.

The felly 1 is formed in the usual manner and has a series of spokes 2 at intervals. A rim 3, of any suitable metal, is superimposed upon the felly and has an interior longitudinal channel or groove 4. This rim is secured to the felly by bolts or other fastenings arranged at intervals.

The tire 5 in what I style the "preferred form" of my invention is formed substantially as shown in Fig. 3 and has an interior opening 6, which extends longitudinally throughout its length and is of an angular or curved form in cross-section or substantially in the form of an elongated C or U. The retaining-band 7, which is inserted in the opening in the tire, is of substantially the same angular or curved form in cross-section as the opening. (See Fig. 3.) The ends of the retaining-band are locked together in their abutting position by securing the elongated head 8 of the bolt 9 in the groove in the retaining-band by screws or rivets or other fastenings, the bolt-head thereby forming a locking-link between the band ends which fits flush in the groove. In the preferred form this is done after the tire is longitudinally compressed, as will be more fully hereinafter explained, and the bolt-head is secured in the channel or groove in the retaining-band by screws 10, which pass through countersunk openings 11 in the band into the bolt-head openings 12. The retaining-band may also be secured to the felly and rim at intervals by bolts or other fastenings. One form of these fastenings is shown in Fig. 2, in which a screw-bar 13 has screw-threads at its opposite ends, one end being inserted in openings in the felly, tire, and rim and screwed into the retaining-band. A lock-nut 14 is then screwed upon the opposite projecting end of the bar 13, and the band, tire, rim, and felly are drawn together. The bar is also provided with an intermediate screw-nut 15, which forms a shoulder to support the band, a space 16 being cut in the tire to receive the nut.

In assembling this form of my invention the channeled rim 3 is superimposed upon and secured to the felly of the wheel, the length of the tire necessary to go around the wheel and allow for proper longitudinal compression is determined, and the tongue part 17, which extends into the channel or groove of the retaining-band, is cut out for a short distance at each end to form a space 18, as shown in Fig. 4, to receive the elongated bolt-head. The tire is longitudinally compressed by any well-known means and is held in its compressed condition by suitable clamps. The ends of the tire when clamped in compressed condition are separated, as shown in Fig. 4, so that the flat elongated head 8 of the locking-bolt 9 can be fitted in the groove in the retaining-band and secured in place by the screws 10, as before stated. The bolt-head 8 is of substantially the same shape and thickness as the groove in the retaining-band, so that the under part of the head of the bolt stands at about the same height from the bottom of the rim as the thickness of the rubber tire under the groove in the metal channel. The ends of the retaining-band are now drawn together or nearly together, thereby pressing the rubber tire firmly into the channeled rim and bringing the countersunk openings 11 in the band into registering position above the openings 12 in the bolt-head 8. The screws 10 are now inserted and secured, thereby securing the bolt-head in the groove of the retaining-band. The lower ends $10^a$ of the screws 10 project beneath the lower surface of the head and embed themselves sufficiently in the rubber beneath the bolt-head to prevent creeping. (See Fig. 4.) This forms a solid rigid joint between the ends of the retaining-band which is smooth on all sides and of the same uniform size throughout. The clamps which hold the rubber in place are then removed, and by a proper tool the rubber tire is drawn up at each end, so as to form a solid butt-joint. A screw-nut $18^a$ is now placed upon the projecting screw-threaded end 19 of the bolt-shank 9 and screwed against the felly, thereby drawing the retaining-band toward the rim and pressing the projecting points 10 of the fastening into that portion of the rubber under the retaining-band, thereby securing the tire and retaining-band to the rim and felly of the wheel and preventing all creeping or longitudinal motion of the tire. The retaining-band when in place is below the outer edges of the flanges of the channeled rim, as shown in Fig. 3, thereby materially strengthening the fastening and absolutely preventing any tendency of the tire or retaining-band being twisted laterally from the channel in the rim. The retaining-band may also be secured at intervals to the rim and felly by the screw-bars 13, fitted into place, as shown in Fig. 2 and heretofore described.

In the construction shown in Figs. 10, 11, 12, 13, 14, 15, 16, and 17 the retaining-band, which in these figures is indicated by the numeral 20, is formed so as to have a channel or groove in its top surface, and the longitudinal opening 21, extending through the tire, is formed so that the tongue 22, of rubber, is on the top. The elongated head 8 of the bolt 9 is provided with a series of countersunk openings 23, and the retaining-band a series of openings 24, which register with the openings in the bolt-head when the band ends are properly brought together beneath the bolt-head. Rivets 25 are inserted and secured in the registered openings, substantially as shown in Fig. 11, to secure the band and bolt-head together, the tire being compressed and clamped and then released in substantially the same manner described with reference to the construction shown in the earlier figures.

The retaining-band can be secured at intervals to the rim and felly by providing it with an elongated opening or hole 26 at each place and also forming a registering opening or hole 27 in the rubber tire of similar elongated form, as shown in Fig. 16, and then inserting a bolt 28, having a similarly-formed head 29 of elongated form, and giving said bolt a quarter-turn to bring its ends above the band edge, substantially as shown in Fig. 14. The bolt is then drawn firmly into place by a lock-nut 30.

The cutting away of the tongue part 17 to provide the space or pocket 18 for the reception of a link or an elongated head of the bolt forms shoulders 31 (see Fig. 9) in the interior of the tire of substantially the same depth as the channel in the retaining-band. The elongated head of the bolt is held, the ends of the link or bolt-head fitting against the shoulders. The great advantage of this is that the bolt-head is held firmly between elastic parts, which are under considerable longitudinal compression, and thus press against the ends of the bolt-head, so that any infinitesimal movement of the tire in a longitudinal direction will be absorbed by the elasticity of the material of the tire instead of creating friction and wear between the tire-shoulders and the ends of the bolt-head. The longitudinal compression of the elastic tire causes the bolt-head to be gripped rigidly between the opposed shoulders, and thereby eliminates any possibility of wear.

Without limiting myself to the precise construction or arrangement of any or all parts shown or confining myself to a combination of any or all of said parts, except as hereinafter particularly pointed out, I claim as my invention—

1. In a vehicle-wheel, a felly, a channeled rim superimposed thereon, a longitudinally-compressed elastic tire superimposed upon and fitting into said rim, a grooved retaining-band extending longitudinally through said tire, a bolt having a flat elongated head seating in said groove for connecting and securing the ends of the retaining-band together and forming a smooth outer joint; said bolt-head being held under compression between two opposed shoulders of the tire, substantially as set forth.

2. In a vehicle-wheel, a felly, a rim on said felly, a longitudinally-compressed tire on said rim having an interior longitudinal opening, a retaining-band in said opening having a channel and a bolt having an elongated head seated flush in the channel gripped longitudinally between shouldered parts of the tire and secured to the ends of the retaining-band, substantially as set forth.

3. In an elastic-tire wheel, a rim, a longitudinally-compressed tire on said rim, a channeled retaining-band extending longitudinally through the interior of the tire, a bolt having a flat head fitting flush into the channel in the retaining-band and connecting the ends of the band together whereby a smooth outer joint and band of uniform size throughout is obtained; the remaining space in the channel on the ends of the flat bolt-head being filled by a tongue projecting from the tire and having shouldered ends which press against the ends of the bolt-head, substantially as set forth.

4. In a vehicle-wheel, a rim, a tire longitudinally compressed on said rim and having an interior longitudinal opening, a retaining-band in said opening having a longitudinal channel in which a portion of said tire projects, said projecting portion being cut away at a certain point to leave a space and opposed shoulders, a bolt having an elongated head fitting in the space formed by cutting away a portion of the rubber and gripped between the opposed shoulders, and devices, such as screws or rivets, securing the head of the two ends of the retaining-band.

5. In a vehicle-wheel, a felly, a channeled rim superimposed thereon, a longitudinally-compressed elastic tire superimposed upon and fitting into said rim and having a longitudinal groove, a grooved retaining-band of corresponding cross-section fitting in the groove in the tire and a bolt having an elongated head fitting flush in the groove in the retaining-band for connecting the ends of the retaining-band together; a portion of the tire within the groove of the retaining-band being cut away to leave a space for the bolt-head and the end walls of said space forming shoulders between which the said bolt-head is held under compression, substantially as set forth.

6. In a vehicle-wheel, a rim, a tire on said rim having a longitudinal angular opening wholly within its interior and a tongue extending into said opening nearly throughout its length, a retaining-band in the opening with its lower surface against and partially inclosing the tongue, a bolt having a head with projections extending into the retaining-band and into the under part of the tire for securing the ends of the band and ends of the tire together; a portion of the said tongue being removed for the reception of the head of the bolt, whereby the tongue in the tire the head of the bolt and the retaining-band is of uniform size throughout and a band of smooth outer surface is attained, substantially as set forth.

7. In a vehicle-wheel, a rim, a tire on said rim having a longitudinal angular opening wholly within its interior and a tongue extending into said opening nearly throughout its length, a retaining-band in the opening partially inclosing the tongue, a bolt having a head with projections extending into the retaining-band and into the under part of the tire for securing the ends of the band and ends of the tire together; a portion of the said tongue being removed for the reception of the head of the bolt.

8. In a vehicle-wheel, a rim, a tire on said rim having a longitudinal angular opening wholly within its interior and a tongue extending into said opening and cut away at one portion only in its circumference, a substantially U or C shaped retaining-band in the opening having its lower surface against and partially inclosing the tongue, a bolt passing through the rim of the wheel and having a head extending into the retaining-band and fitting into the pocket formed by cutting away one portion of the tongue; the bolt-head and tongue being of uniform width and thickness throughout, substantially as set forth.

9. In a vehicle-wheel, a felly, a channeled rim superimposed thereon, a longitudinally-compressed elastic tire superimposed upon and fitting into said rim and having a longitudinal opening and an interior longitudinal tongue, a grooved retaining-band extending through the opening in said tire, an elongated fastening device seating in said groove for connecting and securing the ends of the retaining-band together and forming a smooth outer joint; said fastening device being held under compression between two opposed shoulders of the tongue, and devices, such as screws, passing through the retaining-band and fastening device and embedding in the tire, substantially as set forth.

10. In an elastic-tire wheel, a rim, a tire having an interior longitudinal opening and a tongue extending into the opening, a longitudinally-grooved retaining-band in the opening in the tire surrounding and partially inclosing the tongue, a bolt having an elongated head in the groove of the retaining-band level with the outer edges thereof, and having projections through said band and in the under part of the tire for securing the ends of the retaining-band and the ends of the tire together, whereby a portion of the tongue of the tire being removed, the head of the bolt fills its place and the retaining-band is left smooth on its outer surface and of uniform size throughout, as and for the purpose specified.

11. In an elastic-tire wheel, a rim, a longitudinally-compressed tire having an interior longitudinal opening and a tongue having a portion removed, a retaining-band in the opening in the tire having a longitudinal groove into which the tongue extends, a bolt passing through the rim and having an elongated head in the groove of the retaining-band level with the outer edges thereof, and having projections through said band and in the under part of the tire for securing the ends of the retaining-band and the ends of the tire together, substantially as set forth.

12. In a vehicle-wheel, a felly, a rim on said felly, a longitudinally-compressed tire on said rim having an interior longitudinal opening and an interior longitudinal tongue, a retaining-band in said opening having a channel and a fastening device seating flush in the channel and gripped longitudinally between shouldered parts of the tongue; said fastening device being secured to the ends of the retaining-band, substantially as set forth.

13. In a vehicle-wheel, a felly, a channeled rim superimposed thereon, an elastic tire superimposed upon and fitting into said rim and having an interior longitudinal opening, a grooved retaining-band in said opening, a fastening device fitting flush within a portion of said groove for connecting and securing the ends of the retaining-band together and forming a smooth outer joint and a tongue of rubber projecting from the tire into the groove and filling said groove with the exception of that portion occupied by the fastening device, substantially as set forth.

14. In a vehicle-wheel, a solid rubber tire having an opening of an angular cross-section extending longitudinally through it; an angular hollow retaining-band fitting into said opening and having holes near its ends for the reception of screws or rivets, a T-bolt having an elongated head fitting into the hollow in the retaining-band and having corresponding holes and screws or rivets fitting into said holes for securing the ends of the retaining-band together and having their lower ends projecting into the tire, as and for the purpose specified.

RICHARD MULHOLLAND.

Witnesses:
GEO. A. NEUBAUER,
CHAS. PANKOW.